United States Patent [19]

Dankowski

[11] 4,063,431
[45] Dec. 20, 1977

[54] COMPACT COOLING SYSTEM FOR AUTOMOTIVE VEHICLES

[76] Inventor: Gerhard Dankowski, Rte. 2, Box 59A, Royse City, Tex. 75089

[21] Appl. No.: 713,352

[22] Filed: Aug. 11, 1976

[51] Int. Cl.² .................. B60H 3/04; F01M 1/00; F01M 5/00; F01P 11/08
[52] U.S. Cl. ..................... 62/239; 123/196 AB; 184/104 B
[58] Field of Search ........... 62/239; 184/104 B; 123/196 AB, 41.33

[56] References Cited

U.S. PATENT DOCUMENTS

| | | | |
|---|---|---|---|
| 2,008,164 | 7/1935 | Wolf | 184/104 B |
| 2,054,403 | 9/1936 | Yeager | 184/104 B |
| 2,063,782 | 12/1936 | Barnes | 123/196 AB |
| 2,487,215 | 11/1949 | Blatt | 184/104 B |
| 2,502,554 | 4/1950 | Bonanni | 123/196 AB |
| 2,554,437 | 5/1951 | Alexander | 184/104 B |
| 2,575,877 | 11/1951 | Klier | 184/104 B |
| 3,411,316 | 11/1968 | Wright | 62/239 |

*Primary Examiner*—Lloyd L. King

*Attorney, Agent, or Firm*—Richards, Harris & Medlock

[57] ABSTRACT

An automotive vehicle cooling system is provided, wherein refrigerants are condensed and vehicle oils are cooled in a single unitary heat exchanger mounted forward but spaced apart from the engine radiator in the air path of the engine fan. A vehicle oil conduit is passed through the bottom tank of the engine radiator, and thence through the heat exchanger to efficiently cool the vehicle oil under load conditions without imparting excessive heat to the radiator coolant. When air conditioning is used, refrigerant vapor from a compressor is condensed within the heat exchanger without impairing the cooling of the vehicle oil.

In a preferred embodiment, a heat exchange insert is placed in the oil conduit within the heat exchanger to improve heat transfer, and an auxiliary fan is mounted on the front face of the heat exchanger to supplement the engine fan and the ram air produced by vehicle motion. The fan is activated by a pressure switch sensitive to the pressure head of the refrigerant at the output of the heat exchanger.

8 Claims, 4 Drawing Figures

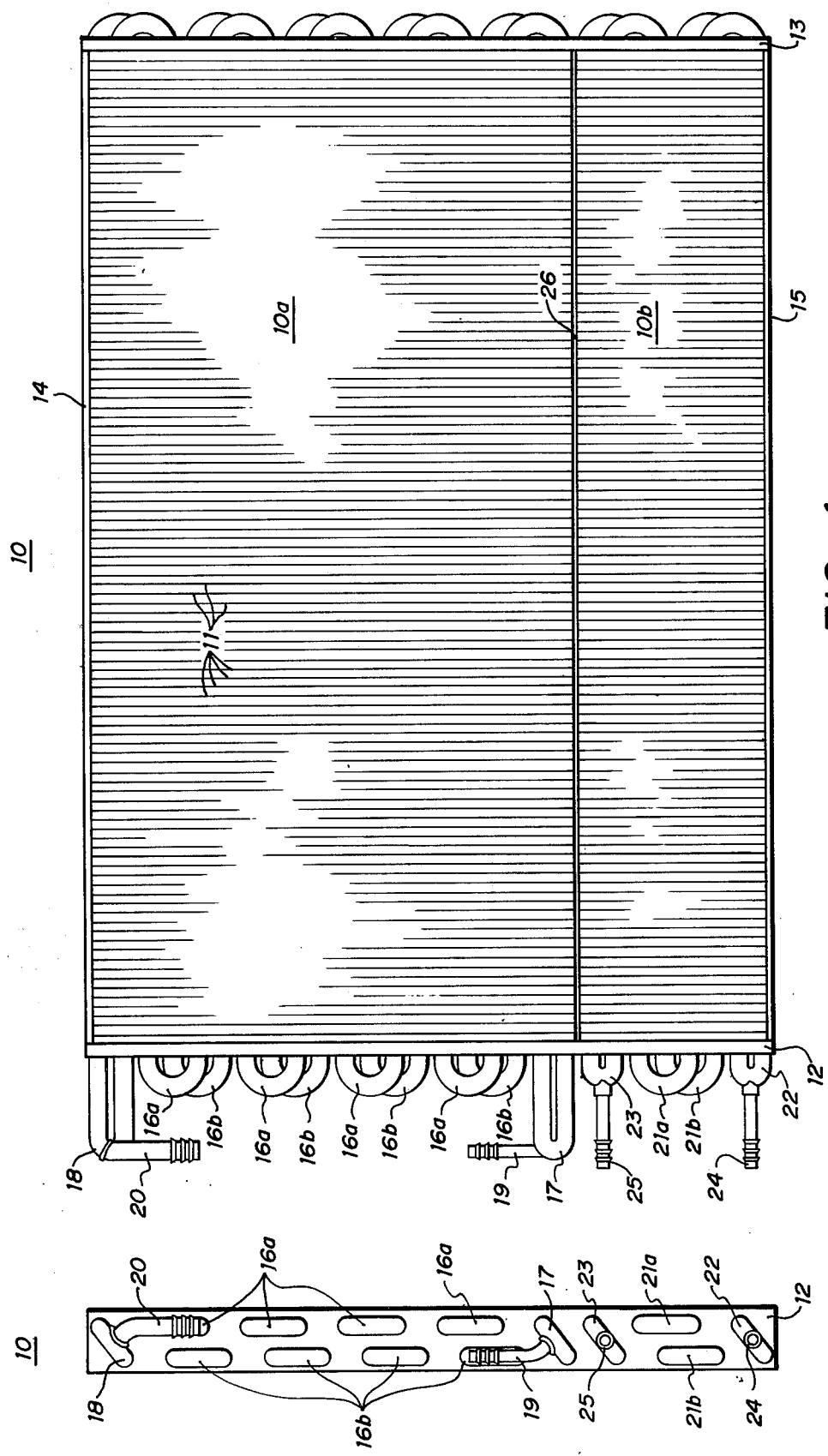

COMPACT COOLING SYSTEM FOR AUTOMOTIVE VEHICLES

FIELD OF THE INVENTION

The invention relates to air-cooled heat exchanger units for automotive vehicles, and more particularly to a unitary heat exchange structure wherein both vehicle oils and refrigerant vapors may be air-cooled without overheating the engine.

PRIOR ART

Cooling systems for automobile engines have long been in use wherein the liquid coolant is delivered by a pump to the cylinder block, and directed forward along the row of cylinders to a thermostat. The thermostat controls the flow of the coolant from the engine block to a radiator, where a heat exchange occurs between the coolant and an air flow created by the combined effect of the forward motion of the vehicle and an engine fan.

Also well known are air conditioning systems for automotive engines, wherein a high pressure refrigerant vapor is discharged from a compressor in a superheated state and directed to a heat exchanger known as a condenser. There the refrigerant vapor is condensed through a heat exchange with a liquid coolant or the surrounding atmosphere. The liquid refrigerant is collected in a receiver in liquid communication with a thermostatic expansion valve. The valve controls the flow of the liquid refrigerant to a heat exchanger known as an evaporator, where a transfer of heat occurs between the refrigerant and the space to be refrigerated. Vaporized refrigerant then is supplied to the suction side of the compressor where the cycle is repeated.

A recurring problem in automotive engines is the over heating of the engine and lubricants, particularly under load conditions including air conditioning and the towing of trailers. To overcome the heating problem, the capacity and number of circulation coils of the engine radiator has been increased, and a bottom tank has been added to the radiator to accommodate an interchange of heat between the coolant and the oil. Under load conditions, however, a further problem has been encountered. The engine or transmission oil may impart excessive heat to the coolant, thereby overheating the engine.

A further improvement to transmission and engine oil cooling systems has been the addition of air cooled heat exchangers. Typical of these are those disclosed in U.S. Pat. No. 2,502,554 to Bonnanni; U.S. Pat. No. 3,334,704 to Gehrke; and U.S. Pat. No. 2,554,437 to Alexander. The Bonnani patent discloses an oil cooling apparatus including an air cooled heat exchanger and a supplemental fan mounted forward of the engine radiator. The patents to Alexander and Gehreke disclose an air cooled heat exchanger for cooling engine oil which is mounted forward of the engine radiator. Each of these systems has alleviated but not satisfactorily eliminated the overheating problem.

With the advent of the Government Emission Standards, emission controls have been implemented to control exhause emissions. Such emission controls have increased engine and exhaust system temperatures, and have caused a space problem in arranging the engine, air conditioning and emission control systems in the compact engine compartments. Such space limitations have restricted the number and size of cooling apparatuses that may be accommodated, and have been reflected by a less than ideal space separation between heat exchange structures. As a result, heat transfers between heat exchange units have occurred, and overheating problems under load conditions have been more prevalent.

The present invention provides an automotive vehicle cooling system wherein a unitary heat exchange structure acts in concert with the engine radiator to condense refrigerant vapors, and cool lubricants without imparting excessive heat to the engine coolant.

SUMMARY OF THE INVENTION

An automotive vehicle cooling system is provided wherein both a refrigerant condenser and an oil cooler are combined in a unitary heat exchange structure. More particularly, a heat exchanger is comprised of a plurality of parallel and vertically disposed but horizontally spaced flat metallic fins. Two vertically spaced and multi-layered sets of interconnected U-shaped conduits extend horizontally across the metallic fins, most of which are severed along a horizontal line intermediate to the two conduit sets to form an air space therebetween. One conduit set is placed in the refrigerant flow path leading from the output of the air conditioning compressor. An oil conduit is passed through the engine radiator, and connected to the input of the second conduit set of the heat exchanger which directs the flow of the oil back into the normal flow path. The heat exchange structure is mounted forward but spaced apart from the engine radiator in the air path of the engine fan to provide both ram air and fan cooling.

In one aspect of the invention, heat exchange inserts are press fitted within the oil cooler conduits to maximize the heat exchange between the oil and the surrounding atmosphere.

In another aspect of the invention, an auxiliary fan is mounted on the front face of the heat exchanger, and activated by a pressure switch sensitive to the pressure head at the output of the condenser.

DESCRIPTION OF THE DRAWINGS

For a more complete understanding of the present invention and for further objects and advantages thereof, reference may now be had to the following description taken in conjunction with the accompanying drawings in which:

FIG. 1 is a front pictoral view of a heat exchanger according to the invention;

FIG. 2 is a side view of the heat exchanger of FIG. 1;

DESCRIPTION OF PREFERRED EMBODIMENTS

Figure 3:
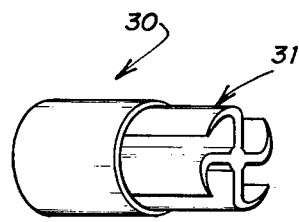
FIG. 3 is an illustration of an oil conduit partially cut away to reveal a heat exchange insert.

FIGS. 1 and 2 illustrate the front and a side view, respectively, of a heat exchanger 10 according to the invention.

The heat exchanger 10 is comprised of parallel and vertically disposed but horizontally spaced flat metallic fins 11. Partially enclosing the metallic fins are side plates 12 and 13, and fin guards 14 and 15. Passing horizontally through the metallic fins and the side plates are two layers of interconnected U-shaped conduits 16a and 16b, which are joined by U-shaped connectors 17 and 18 to hose fittings 19 and 20, respectively. Vertically spaced from conduits 16a and 16b are two layers of U-shaped conduits 21a and 21b, which also pass horizontally through the metallic fins and side plates. Conduits 21a and 21b are joined by U-shaped connectors 22 and 23 to hose fittings 24 and 25, respectively.

Although conduits of a particular shape have been described, it is to be understood that other conduit orientations and shapes may be used with equal effectiveness. For example, conduits 16a, 16b and 21a, 21b may be horizontally or vertically disposed spirals.

An air space 26 is formed by severing plural ones of fins 11 along a horizontal line intermediate to conduits 16a, 16b and conduits 21a, 21b. The heat exchange between the upper and lower fin sections thereby is interrupted, and heat exchanger 10 effectively is partitioned into a condenser 10a and an oil cooler 10b.

In the preferred embodiment described herein, fins 11, conduits 16a and 16b, and conduits 21a and 21b are made of aluminum for efficient heat transfer. It is to be understood, however, that the fins and conduits may be formed from any material having similar heat exchange properties. The fins 11 number approximately 205, and each is of a width of about 1.25 inches and a length of about 14 inches. The air space 26 is of the order of 10 millimeters in width. The conduits 16a, 16b and 21a, and 21b have outer diameters of approximately 0.375 inches and inner diameters of approximately 0.25 inches. The centers of conduits 16a are displaced from the centers of conduit 16b by a distance of approximately 0.625 inches. The overall physical dimensions of heat exchanger 10 are such as to be accommodated within a space approximately 23.187 inches wide, 14 inches in height, and 1.31 inches in depth.

Side plates 12 and 13 preferably are made from steel or aluminum, while fin guards 14 and 15 may be a plastic or other material suitable for protecting the fins from damage.

In operation, high pressure refrigerant vapor is received from an air conditioning compressor at fitting 20. The vapor is condensed by the heat exchange between metallic fins 11 and the surrounding atmosphere. The condensed refrigerant is provided at fitting 19 leading to a receiver dryer (not shown).

Engine oil or transmission oil of an automotive vehicle enters fitting 25, and is cooled by the heat transfer between metallic fins 11 and the surrounding atmosphere. The cooled oil then is provided at fitting 24.

In accordance with the invention, heat flow between condensor 10a and oil cooler 10b is minimized by locating the oil cooler below the condenser rather than in the air path to the condenser, and by interposing air space 26 between the oil cooler and condenser.

FIG. 3

FIG. 3 illustrates an oil conduit 30 which is partially cut away to expose a heat exchange insert 31 which extends the length of the conduit.

Referring to FIG. 3, the insert 31 is comprised of four curved surfaces depending laterally from a common center and separated by approximately 90°. The insert preferably is made of aluminum, and is press fitted with conduit 30. The outer surface area of the curved surfaces are formed to maximize metal to metal contact with conduit 30, and thereby provide an efficient heat transfer. It has been found that such an insert substantially improves heat exchange between the oil flowing through conduits 21a, 21b of oil cooler 10b and the air moving between metallic fins 11.

FIG. 4

Figure 4:
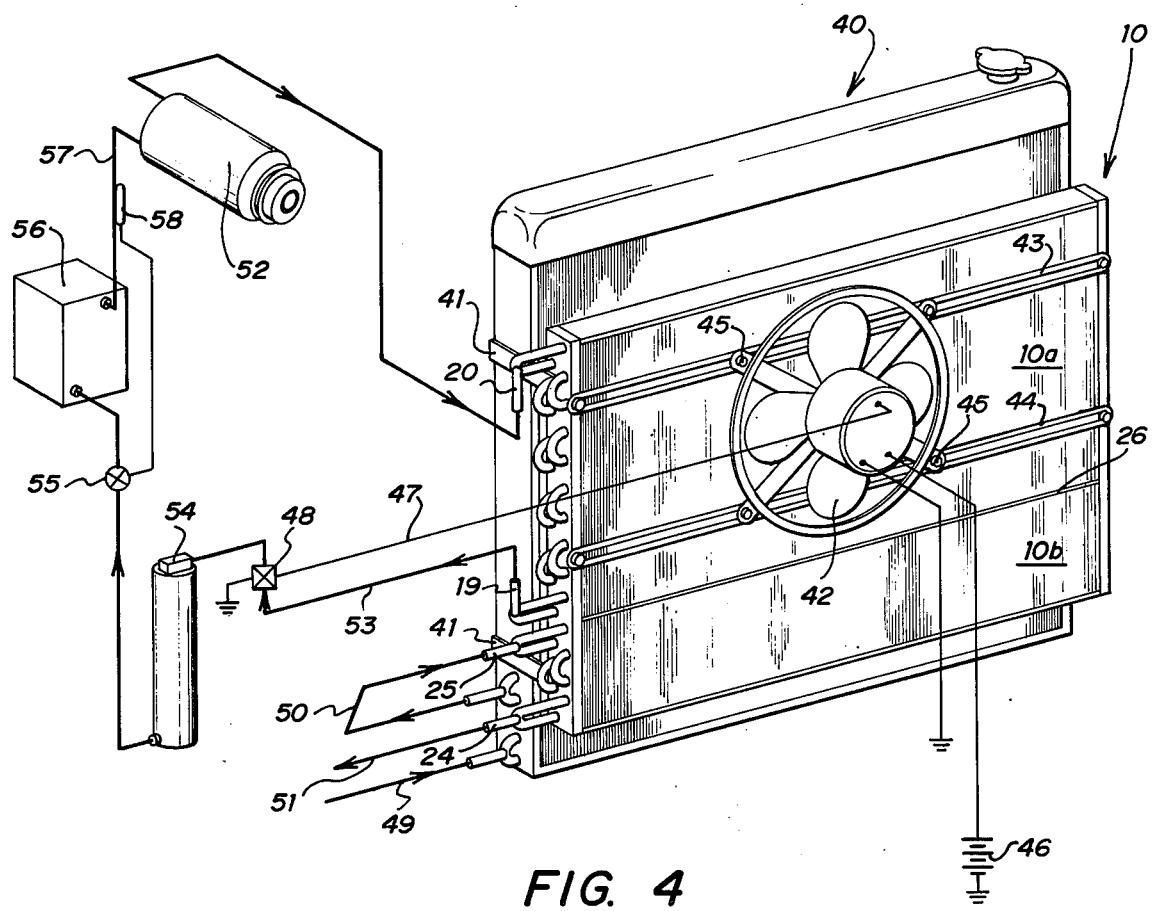
FIG. 4 is a functional electromechanical block diagram of an automotive vehicle cooling system embodying the invention.

FIG. 4 is an electromechanical functional block diagram illustrating an automotive vehicle cooling system.

Heat exchanger 10 is mounted to the front face of an engine radiator 40 with brackets 41. An electrically energized fan 42 is mounted on slotted brackets 43 and 44 which extend horizontally across condenser 10a of heat exchanger 10. Fan 42 may be positioned by sliding the fan along brackets 43 and 44, and may be held in place by tightening friction clamps 45.

The ground terminal of the electric motor driving fan 42 is connected to ground, and the voltage terminal of the motor is connected through a 12 volt DC source 46 to ground. An enable terminal of the fan motor is connected by way of a conductive line 47 to a pressure switch 48 having a ground terminal connected to ground.

Engine or transmission oil is supplied to a conduit 49 leading to the lower part of radiator 40. The oil flows through conduits extending horizontally across the radiator, and thence to a conduit 50 leading to oil cooler 10b of heat exchanger 10. The output of oil cooler 10b is supplied to a conduit 51 leading to an oil flow path.

A compressor 52 supplies a high pressure refrigerant vapor to condenser 10a of heat exchanger 10. The vapor is cooled, and the condensate is supplied to a conduit 53 which is connected to the input of pressure switch 48. The output of pressure switch 48 is in fluid communication with the input of a receiver dryer 54 which absorbs water vapor and supplies collected refrigerant condensates to a themostatic expansion valve 55. The output of valve 55 is supplied to the input of an evaporator 56, which in turn supplies refrigerant vapors to a conduit 57 leading to the input of compressor 52. A thermostatic gas bulb 58 of valve 55 is placed in contact with conduit 57.

In the preferred embodiment, the pressure switch 48 may be of a type such as that manufactured and sold by Texas Instruments, Inc. of Versailles, Kentucky, and offered to the public as Model No. 20PS002KA2-6OR21OR. Evaporator 56 may be of a type such as that manufactured by Danhard, Inc. of Dallas, Texas, and represented to the public as Model No. UN-245. Compressor 52 may be of a type manufactured and sold by the York Division of the Borg Warner Corporation of York, Pennsylvania, and represented to the public as Model No. F209, Part No. 16764. The receiver dryer 54 may be of a type such as that manufactured and sold by Singer Control Company of America of Milwaukee, Wisconsin, and available to the public as Model No. 70412-501. The electric motor of fan 42 may be of a type such as Model No. 8659FH manufactured and sold by Leece Nevilce Company of Cleveland, Ohio. The fan blades preferably are aluminum such as the type manufactured and sold by Brookside Corporation of McCordsville, Indiana, and represented to the public as Model No. 202312-1.

In operation, oil from the transmission or engine of an automotive vehicle is supplied to conduit 49, and circulated through the lower part of radiator 40 where an initial heat exchange occurs with the coolant in the radiator. The oil then is supplied through a conduit 50 to oil cooler 10b of heat exchanger 10 where the oil is air cooled before returning to its normal flow path by way of conduit 51. The circulation of the oil through both the radiator and the oil cooler 10b provides an efficient means of cooling the oil without imparting a prohibitive amount of heat to the radiator coolant. A reserve heat capacity thus is provided in the coolant to accommodate load conditions such as the running of the air conditioning or the towing of trailers.

The high pessure refrigerant vapors supplied by compressor 52 is circulated through the condenser 10a of heat exchanger 10, where the vapor is cooled and the condensate therefrom is supplied by way of conduit 53 through pressure switch 48 to the receiver dryer 54. Pressure switch 48 is sensitive to the pressure in conduit 53, and activates fan 42 by way of conducting line 47 when the pressure head exceeds a threshold value. Receiver dryer 54 absorbs water moisture and collects the condensed refrigerant. The condensate is supplied to the thermostatic expansion valve 55 which adjusts the flow rate of the liquid refrigerant to maintain a vapor state in conduit 57. The refrigerant vapor in conduit 57 enters the suction side of compressor 52 and is compressed to a higher pressure.

The cooling of the oil and the refrigerant vapor occurs as a result of a heat exchange between the metallic fins 11 of heat exchanger 10, and the air flowing through the heat exchanger to radiator 40. As before stated, the circulation of the oil through both the radiator and the oil cooler of heat exchanger 10 provides an efficient means for cooling the oil without imparting prohibitive amounts of heat to the radiator coolant. The reserve heat capacity of the radiator coolant further is preserved by interrupting the heat transfer between radiator 40, condenser 10a and oil cooler 10b. Accordingly, the spacing between heat exchanger 10 and radiator 40 preferably is at least 0.75 inches to effectively minimize the transfer of heat therebetween. In addition, the air space 26 interrupts the heat exchange between the condenser 10a and the oil cooler 10b.

When the automotive engine is operating, the engine fan (not shown) pulls air through heat exchanger 10 and radiator 40. Further, when the vehicle is in forward motion, the refrigerants and oil circulating through heat exchanger 10 are cooled by a ram air effect supplementing the engine fan. Under severe load conditions where the engine fan and the ram air effect are not sufficient, the engine heat may increase as reflected by an increase in pressure in conduit 53. When the pressure head in conduit 53 exceeds a threshold value, however, switch 48 activates fan 42 to provide an additional air source.

In accordance with the invention, there is provided an automotive vehicle cooling system which combines an air conditioning condenser and an oil cooler in a unitary air cooled structure to conserve space. Heat transfer between the condenser and the oil cooler is minimized by an air space therebetween, and the unitary structure is mounted forward but spaced apart from the engine radiator to further minimize undesirable heat exchanges. In addition, lubricants are passed serially through the engine radiator, and thence through conduits in the oil cooler having heat exchange inserts therein to maximize the heat transfer to the surrounding atmosphere without imparting excessive heat to the engine coolant.

Having described the invention in connection with certain specific embodiments thereof, it is to be understood that further modifications may now suggest themselves to those skilled in the art. For example, the novel features of the invention described herein may be applied to stationary engines as well as automotive vehicles. Further, the auxiliary fan may be activated by a temperature sensitive switch sensing oil temperature or engine heat when the air conditioning system is not in use. It is intended to cover such modifications as fall within the scope of the appended claims.

What is claimed is:

1. A compact cooling system for an automotive vehicle having an engine fan for forcing air along an air path, an air conditioning system for cooling vehicle compartments with a refrigerant, and circulating means for carrying a liquid lubricant and a liquid coolant from the power train of said vehicle, which comprises:
   first heat exchange means mounted to said vehicle in said air path and in fluid communication with said circulating means for cooling said lubricant and said coolant;
   second heat exchange means mounted forward but spaced apart from said first heat exchange means and in fluid communication with said air conditioning system and said first heat exchange means for condensing said refrigerant and further cooling said lubricant;
   an electrically activated fan mounted on the forward face of said second heat exchange means; and
   a pressure switch in electrical communication with said fan and sensitive to refrigerant pressure in said air conditioning system for enabling said fan when said refrigerant pressure exceeds threshold level.

2. In an automotive vehicle having a power plant and conduits carrying lubricants throughout said power plant and further having a cooling system including an engine fan, an engine radiator, a condensate receiver, an evaporator in fluid communication with said receiver, and a compressor in fluid communication with said evaporator, the combination which comprises:
   heat exchanger means of unitary structure mounted forward but spaced apart from said radiator in the air path of said engine fan, and in fluid communication with said compressor, said evapoator and said conduits for condensing refrigerant vapors supplied by said compressor and cooling said lubricants; and
   means mounted to said heat exchanger means for cooling said heat exchanger means and said radiator in response to fluid pressure in said heat exchanger means.

3. A system for cooling lubricants and refrigerants, which comprises:
   a housing for coolants in fluid communication with conduits carrying said lubricants;
   unitary heat exchange means mounted forward but spaced apart from said housing, and receiving said lubricants from said housing for cooling said lubricants and said refrigerants;
   an electrically activated fan mounted on the forward face of said heat exchange means for air cooling said heat exchange means and said housing;
   switch means in electrical communication with said fan and in fluid communication with said heat exchange means for activating said fan when the pressure of said refrigerants in said heat exchange means exceed a threshold value;
   condensate receiver means in fluid communication with said switch means for collecting condensates;
   valve means in fluid communication with said receiver means for controlling the flow of said condensates;
   evaporator means in fluid communication with said valve means for transferring heat from an area to be cooled to said condensates; and compressor means receiving a refrigerant vapor from said evaporator means for providing a pressurized refrigerant vapor to said heat exchange means.

4. A compact cooling system for an automotive vehicle having an engine using a liquid lubricant and a liquid coolant for lubricating and cooling the engine, a fan for forcing air along an air path, an air conditioning system using a refrigerant for cooling the vehicle compartments, comprising:
- a first heat exchanger mounted said vehicle in the air path;
- means for circulating the liquid coolant between the engine and said first heat exchanger;
- means for directing the liquid lubricant from the engine to said first heat exchanger;
- a second heat exchanger mounted forward and spaced apart from said first heat exchanger and in the air path, said second heat exchanger including an upper section in fluid communication with the refrigerant and a lower section disposed vertically below the upper section and separated from the upper section by an air gap and in fluid communication with lubricant from said first heat exchanger;
- circulation means for circulating refrigerant between the air conditioning system and the upper section of said second heat exchanger; and
- means for directing the lubricant from said first heat exchanger to the lower section of said second heat exchanger.

5. A compact cooling system for an automotive vehicle having an engine using a liquid lubricant and a liquid coolant for lubricating and cooling the engine, a fan for forcing air along an air path, and an air conditioning system using a refrigerant for cooling vehicle compartments comprising:
- a first heat exchanger mounted to said vehicle for receiving the liquid lubricant and liquid coolant therethrough to cool the lubricant and coolant;
- a second heat exchanger including an upper section having a plurality of substantially parallel, vertically disposed metallic fins horizontally spaced one from the other and a plurality of layered interconnected first conduits vertically spaced and extending horizontally through said metallic fins, said conduit receiving refrigerant from the air conditioning system for cooling the refrigerant; and a lower section separated from said upper section by an air gap but substantially in the plane of said upper section and having a plurality of substantially parallel, vertically disposed metallic fins horizontally spaced one from the other and a plurality of layered interconnected second conduits extending horizontally across said metallic fins for receiving lubricant from said first heat exchanger for cooling said lubricant.

6. The cooling system according to claim 5 further comprising:
- a metallic heat exchange insert positioned within said first or second conduits, said insert having plural curved surfaces depending tranversely from a common center.

7. A compact cooling system for an automotive vehicle having an engine using a liquid lubricant and a liquid coolant in fluid communication between the engine and a radiator for cooling the lubricant and coolant, an air conditioning system using a refrigerant for cooling vehicle compartments, comprising:
- a frame;
- a plurality of parallel, vertically disposed metallic fins horizontally spaced one from the other and supported by said frame;
- a conduit extending horizontally across said metallic fins for receiving refrigerant from said air conditioning system for cooling said refrigerant,
- a plurality of parallel, vertically disposed metallic fins horizontally spaced one from the other and supported in said frame, vertically below said first set of metallic fins and separated therefrom by an air gap;
- a second conduit extending horizontally across said second metallic fins for receiving liquid lubricant from said radiator to further cool said lubricant.

8. The cooling system according to claim 7 further comprising:
- a metallic heat exchange insert positioned within said first or second conduit, said insert having plural curved surfaces depending transversely from a common center.

* * * * *

UNITED STATES PATENT AND TRADEMARK OFFICE
CERTIFICATE OF CORRECTION

PATENT NO. : 4,063,431
DATED : December 20, 1977
INVENTOR(S) : Gerhard Dankowski It is certified that error appears in the above-identified patent and that said Letters Patent are hereby corrected as shown below:

Col. 3, line 61, "with" should be -- within --.
Col. 5, line 5, "pessure" should be -- pressure --.
Col. 7, line 10, "mounted said vehicle" should be -- mounted to said vehicle --.
Col. 8, line 16, "tranversely" should be -- transversely --.

Signed and Sealed this

Second Day of May 1978

[SEAL]

Attest:

RUTH C. MASON
Attesting Officer

LUTRELLE F. PARKER
Acting Commissioner of Patents and Trademarks